United States Patent [19]

Hartung et al.

[11] 3,919,462

[45] Nov. 11, 1975

[54] METHOD AND APPARATUS FOR SCRAMBLING AND UNSCRAMBLING COMMUNICATION SIGNALS

[75] Inventors: Albert F. Hartung, Woodland Hills; Frank W. Lehan, Santa Barbara; Charles T. Barooshian, Pacific Palisades; Edward J. Zacharski, Malibu, all of Calif.

[73] Assignee: System Development Corporation, Santa Monica, Calif.

[22] Filed: Aug. 15, 1973

[21] Appl. No.: 388,439

[52] U.S. Cl. ............ 178/5.1; 178/DIG. 13; 178/22; 325/34

[51] Int. Cl.[2] ............ H04N 1/44

[58] Field of Search ............ 178/5.1, DIG. 13, 22; 325/34

[56] References Cited

UNITED STATES PATENTS

| | | | |
|---|---|---|---|
| 3,106,604 | 10/1963 | Shanahan | 178/5.1 |
| 3,184,537 | 5/1965 | Court et al. | 178/5.1 |
| 3,527,877 | 9/1970 | Walker | 178/5.1 |
| 3,538,243 | 11/1970 | Shanahan et al. | 178/5.1 |
| 3,732,355 | 5/1973 | Harna et al. | 178/5.1 |
| 3,757,225 | 9/1973 | Ulicki | 178/5.1 |
| 3,777,053 | 12/1973 | Wittig et al. | 178/5.1 |
| 3,789,131 | 1/1974 | Harney | 178/5.1 |
| 3,790,700 | 2/1974 | Callais et al. | 178/5.1 |
| 3,801,732 | 4/1974 | Reeves | 178/5.1 |

*Primary Examiner*—Maynard R. Wilbur
*Assistant Examiner*—S. C. Buczinski
*Attorney, Agent, or Firm*—Fulwider, Patton, Rieber Lee & Utecht

[57] ABSTRACT

Method and apparatus for scrambling and unscrambling television video and audio signals in a subscription television system in which program selections of subscribers are known at a central transmitting site, and control signals encoded into vertical blanking intervals of the video signals are addressed to receivers authorized to receive unscrambled transmissions, to selectively control unscrambling at those receivers. In an unscrambler at each subscriber's receiver, the control signals are decoded, and, if addressed to the particular subscriber's receiver, operate to enable or disable the unscrambler, or to frequently vary its mode of operation, thereby greatly increasing the security of the system and deterring viewing of scrambled transmissions. Video scrambling and unscrambling are effected by inversion of selected horizontal lines of a transmitted television picture, and possible modes of scrambling and unscrambling include inversion of alternate groups of equal numbers of lines, inversion or non-inversion selected on a line-by-line basis, with an appropriate control signal being transmitted with each line, and inversion or non-inversion in a preselected sequence, as determined by synchronized logic at the receivers and the transmitting site.

52 Claims, 16 Drawing Figures

METHOD AND APPARATUS FOR SCRAMBLING AND UNSCRAMBLING COMMUNICATION SIGNALS

BACKGROUND OF THE INVENTION

This invention relates generally to techniques for scrambling and unscrambling television signals, and, more particularly, to improved scrambling and unscrambling techniques applied to a subscription television system controllable by a central computer.

In subscription television, or "pay-T.V." systems, subscribers select programs that they wish to view, and pay to have those programs transmitted to their television receivers, usually along a coaxial cable. One requirement for such systems is that the transmitted signals should be unintelligible to non-subscribers or to subscribers who have not paid for a particular program. Various methods have been suggested for scrambling video signals, such as by inserting time delays, or by inverting portions of the video signals so that white and black images are reversed on portions of the television screen.

The success of a particular scrambling technique depends, first of all, on whether a program is sufficiently scrambled to deter unauthorized viewers from watching it in a scrambled condition, and secondly, on how difficult it is for a resourceful viewer to circumvent the protection provided by the scrambling techniques.

Some prior systems provide for limited variation of the mode of scrambling and unscrambling, these generally requiring the insertion of a coded card, or the like, to correctly unscramble the signals. However, there has long existed a need for a scrambling technique in which security can be maximized by rapidly and automatically varying the scrambling mode, without the need for manual intervention by the subscribers, and which will effectively deter viewers of the scrambled television picture. The present invention fulfills this need.

SUMMARY OF THE INVENTION

The present invention resides in a method and apparatus for scrambling and unscrambling television signals, wherein the mode of scrambling and unscrambling may be varied automatically and continually in order to increase the security of the system and to deter unauthorized viewers. Briefly, and in general terms, the method of the invention, as it relates to unscrambling at a receiver, includes the steps of receiving encoded control signals and encoded identifiers of authorized receivers along with scrambled television signals, decoding the encoded control signals and identifiers, comparing the received identifiers with a unique identifier associated with the receiver, and, if the comparison results in a match, automatically unscrambling the television signals in accordance with an unscrambling mode contained in the control signals.

The invention is particularly well suited for use in a subscription television system in which the subscribers select programs in advance by direct telephone or other communication with a central computer. The computer controls a transmitter which can address control signals to unscrambling equipment at each subscriber's receiver by means of a unique identifier associated with that equipment. Thus, the unscrambling equipment of those subscribers who have selected a particular program can be conditioned to unscramble the program signals, and to receive subsequent control signals relating to changes in the scrambling mode. It will be apparent that the transmitted signals have to be scrambled according to the same mode as that used in unscrambling, and that scrambling and unscrambling have to be completely synchronized.

There is an unscrambling means, or unscrambler, at each subscriber's receiver, and it basically includes decoding means, to decode the control signals and encoded identifiers, identifier comparison means, to accept only control signals intended for the particular receiver, and scramble decoder means, to unscramble the television signals in accordance with an unscrambling mode contained in the control signals. The audio portion of a television signal may also be scrambled, and the unscrambler may include means for unscrambling these audio signals at the receiver site.

More specifically, in a presently preferred embodiment of this invention, video signals are scrambled by the inversion of some of the horizontal lines making up a television picture. This has the disconcerting effect of reversing the black and white portions of the inverted lines, in a black and white picture, or inverting the color spectrum in a color picture. The scrambling mode at any instant may be such that, for example, the inverted lines form patterns of regularly or irregularly spaced bars across the picture, and the bars may be made to roll up or down. Furthermore, the scrambling mode may be changed at a rapid rate, producing an almost infinite variety of moving patterns of inverted lines on the screen if the signals are not unscrambled prior to video display.

The scrambled video signals produced by inversion of some of the horizontal picture lines are unscrambled at each authorized receiver by one of the unscramblers, which are functionally complementary to scrambling means at the transmitter. In the preferred embodiment, receiver identifiers and control signals are encoded into a conventionally formed, composite video and synchronization signal, specifically in those portions of the video and synchronization signal relating to vertical blanking intervals, during which a conventional television picture tube has its electron beam returned to the top of the tube after scanning a complete field of the picture.

In the unscrambler at a particular receiver, these identifiers and control signals are decoded, and the identifiers are compared with the unique identifier associated with the receiver. If a match is found, the control signals are further decoded and applied in the unscrambler to enable or disable unscrambling, to change the mode of unscrambling, or to select a particular program on a separate frequency channel. If no match is found, the control signals have no special meaning for the receiver in question. However, a special "all-call" identifier is available to allow all receivers in the system to be controlled, regardless of whether or not they have been individually addressed to enable unscrambling. Also, certain control signals have meaning for all receivers which have been previously specifically addressed to enable unscrambling operations. In particular, an unscrambler synchronization signal, used to synchronize scrambling and unscrambling, is in this latter category, and, in one embodiment, the unscrambling mode for all enabled unscramblers may be changed by control signals not associated with a particular identifier.

In one of three alternative embodiments of the invention, the scrambling of unscrambling mode depends on the selection of a digit from a plurality of digits in a counter used to count horizontal picture lines transmitted or received. The video signal is then inverted, for scrambling or unscrambling, only when the selected digit is in a particular state.

In another of the three alternative embodiments, each horizontal line of video information is transmitted with an encoded signal indicating whether the line is inverted or not. The unscrambler decodes this signal and accordingly unscrambles the video signals.

In a third alternative embodiment, the decision whether or not to invert a particular line being scrambled or unscrambled is derived from the contents of a register, which is itself scrambled in a predetermined manner while the previous line is being transmitted or received. Different scrambling modes may be established by storing different starting patterns in the register.

Scrambling of the television signal may also include scrambling the audio portion of the signal, by some means, to further deter unauthorized persons from watching a scrambled transmission. Conventionally, the audio signal is transmitted on a frequency-modulated carrier spaced from the video carrier by a preselected frequency difference. In the presently preferred embodiment of the invention, the audio carrier is shifted away from the video carrier so that the magnitude of the difference between the video and audio carriers is increased, thus preventing detection of the audio signal in a normally aligned receiver. Unscrambling is effected by a corresponding frequency shift in a downward direction.

It will be appreciated from the foregoing that the present invention significantly advances the state of the art of scrambling and unscrambling television signals in subscription television systems. In particular, since the invention is operable to vary the scrambling mode rapidly and automatically, it provides greatly increased security from unauthorized unscrambling of signals intended only for certain subscribers, without the necessity of subscriber identification by manual means. Moreover, the scrambling mode may be selected and varied to deter most unauthorized viewers from watching the scrambled video patterns, especially since the audio signal may also be unavailable to the unauthorized viewers. Other aspects and advantages of the invention will become apparent from the following more detailed description taken in conjunction with the accompanying drawings.

DESCRIPTION OF THE PREFERRED EMBODIMENT

Figure 1:
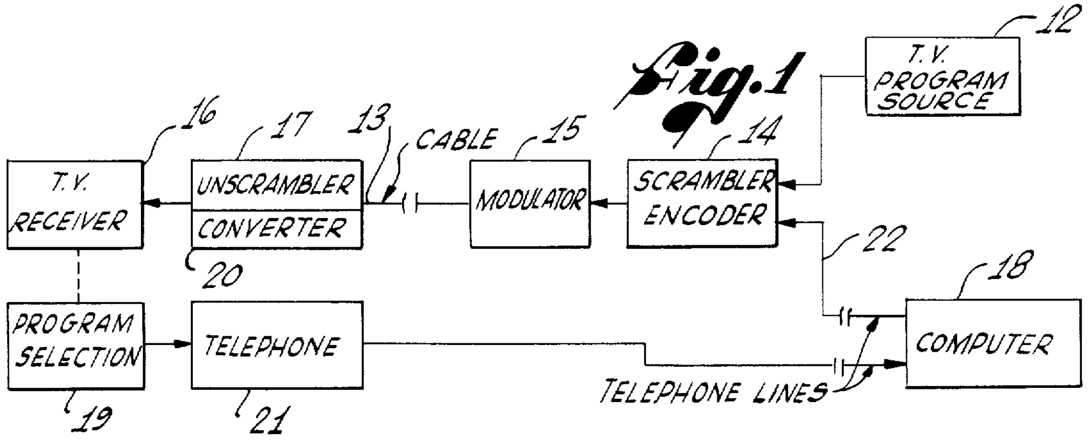
FIG. 1 is a block diagram showing the subsystem components of a subscription television system in which the invention might be used.

As shown in the drawings for purposes of illustration, the invention is particularly well suited for use in a computer controlled subscription television system, the principal components of which are shown in FIG. 1. In such a system, signals from a television program source 12, such as a television camera or a television network, are transmitted to paying subscribers, typically, but not necessarily, by means of a coaxial cable 13. In order to prevent non-subscribers and subscribers who have not paid for a particular program from receiving the transmission, the signals from the television program source 12 are processed by a scrambler-encoder 14, which modifies the signals in some fashion to make them unintelligible to an unauthorized receiver. A modulator 15 uses the signals from the scrambler-encoder 14 to modulate a high frequency carrier for transmission along the cable 13. The modulator 15 is conventional except that its audio portion is realigned to scramble audio signals by shifting the audio carrier and thereby increasing the frequency difference between the video and audio carriers.

Each subscriber to the system has a conventional television receiver 16, and is supplied with an unscrambler 17 connected between the cable 13 and the receiver. The unscrambler 17 may have associated with it a converter 20 for converting specially assigned carrier frequencies, used for transmission over the cable, to a frequency corresponding to an unused numbered channel to which the receiver 16 can be tuned. Although only one receiver 16 is shown in FIG. 1, it will be appreciated that, in general, a number of separate receivers will be connected to the cable 13.

In the system illustrated, a central computer 18 is used to maintain records of available programs and of programs selected by the subscribers. Each subscriber selects the programs he wishes to view (indicated by the block 19), and conveys his selections to the central computer 18 by means of a telephone 21. The selections may be communicated to the computer 18 directly by means of some digital attachment (not shown) acoustically coupled to the telephone 21, or may be input to the computer by an operator in voice communication with the subscribers. Alternatively, there may be a reverse communication path along the cable 13 to the computer 18, so that a subscriber may select programs by operating switches or buttons (not shown) at his television receiver 16. However the programs are selected is of little consequence so far as the present invention is concerned, so long as there is some means to determine which subscribers are authorized to receive various programs. The scrambler-encoder 14, which is also connected to the computer 18, typically by a telephone line 22, may then be directed to encode appropriate unscrambler control signals for transmission with the conventional television signals.

Figure 2:
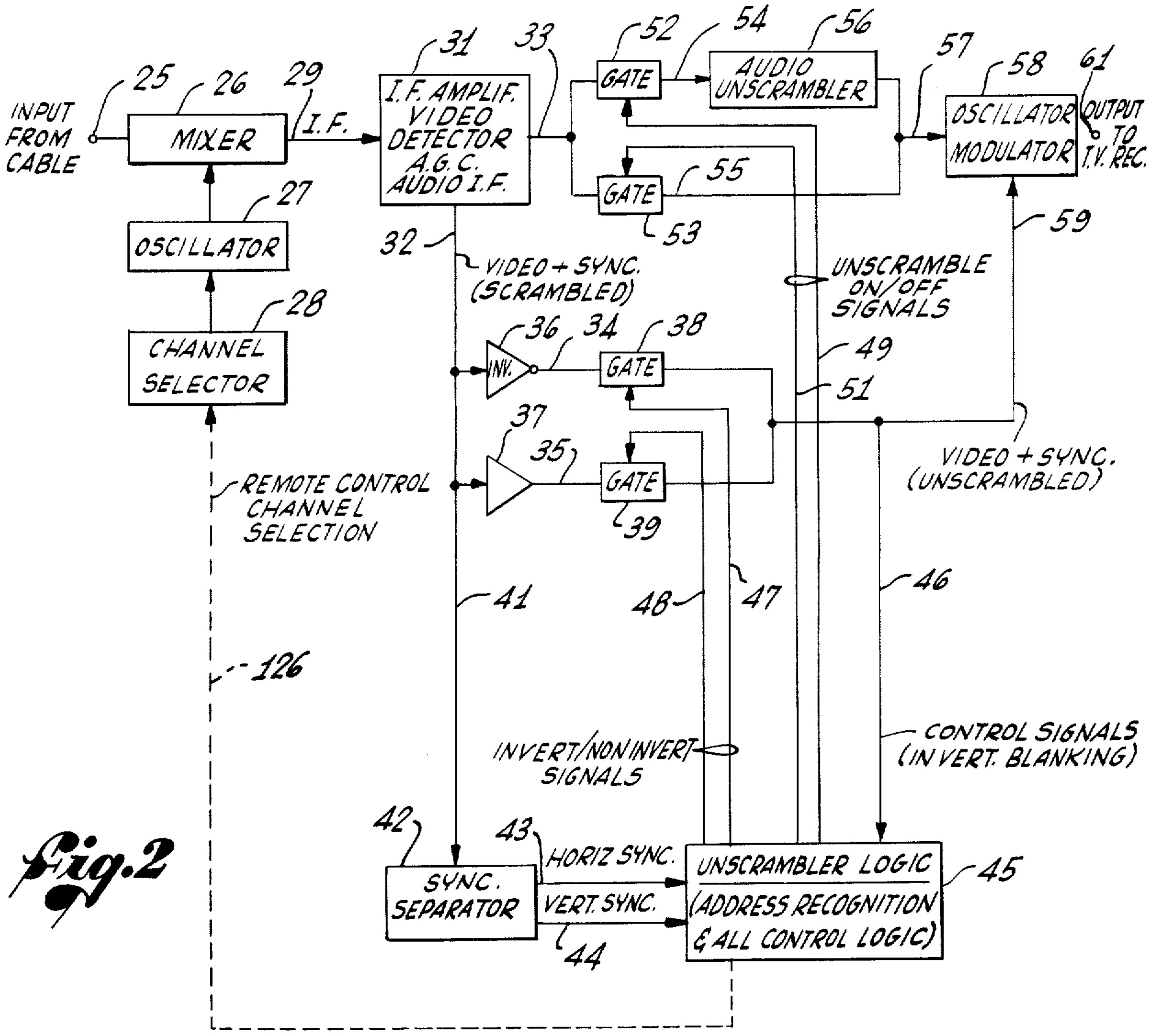
FIG. 2 is a block diagram showing an unscrambler which may be employed in the system of FIG. 1, and showing how the apparatus of the invention might be connected with the system.

The present invention is principally concerned with improved techniques employed in the scrambler-encoder 14 and the unscrambler 17, and FIG. 2 illustrates in block diagram form the unscrambler 17 used in a presently preferred embodiment of the invention. It will be appreciated, however, that, in systems involving signal scrambling and unscrambling, the techniques used in unscrambling are functionally complementary to those used in scrambling. Consequently, although only the unscrambler 17 is described in detail herein, it will be understood that complementary techniques are used in the scrambler-encoder 14, and that these techniques will be readily apparent to those of ordinary skill in the art.

As will be apparent from FIG. 2, many elements of the unscrambler 17 are conventional in the television electronics art, and these are described herein only for the purpose of illustrating the environment in which the improvements constituting the invention will operate. The scrambled television signals from the cable 13 (FIG. 1) are input to the unscrambler 17 through an input terminal 25 and processed by a conventional mixer 26 connected with a conventional oscillator 27 and channel selector 28. The output from the mixer 26 is an intermediate frequency (IF) signal, which, as shown by the line 29, is connected to conventional circuitry performing the functions shown in block 31, including IF amplification, video detection, automatic gain control, and audio IF amplification. As shown in FIG. 2, the output from these conventional circuits grouped in block 31 includes a composite video and synchronization signal, which is still in scrambled form, along line 32, and an audio IF signal, along line 33.

The scrambled video and synchronization signal on linee 32 is gated through one of two parallel paths 34 and 35 including an inverting amplifier 36 and a non-inverting amplifier 37, respectively, and controlled by conventional gating circuits 38 and 39, respectively. When the gate 39 is open and the gate 38 is closed, the composite video and synchronization signal is not inverted and appears, for example, like the signal shown in FIG. 4a. However, when the gate 39 is closed and the gate 38 opened for the video portions of the composite signal, the video portions are inverted, as shown in FIG. 4*b*. The composite video and synchronization signal on line 32 is also input over line 41 to a synchronization separator 42, which uses techniques well known in the art to separate the conventional television synchronization signals from the composite signal, and to transmit these along lines 43 and 44 to unscrambler logic 45, the detail of which is central to this invention, and will be discussed herebelow in connection with FIG. 3.

The unscrambler logic 45 receives control signals encoded in the composite video and synchronization signal along line 46, and operates to generate two basic output control signals: and "invert" or "non-invert" signal on lines 47 and 48, respectively, connected to the gating circuits 38 and 39 to control inversion or non-inversion of the video signal, and an "unscramble on" or "off " signal on lines 49 and 51, respectively, connected to additional gating circuits 52 and 53, respectively, to control audio unscrambling. The audio IF signal on line 33 takes one of two parallel paths 54 and 55 as determined by the gating circuits 52 and 53, the path 54 passing through an audio unscrambler 56 before merging with the alternate path 55 and being input over line 57 to conventional oscillator and modulator circuits 58. The composite video and synchronization signal, as unscrambled under the control of the unscrambler logic 45, is also input to the oscillator and modulator 58, over line 59, and is there used, together with the audio signal input over line 57 to modulate a high frequency carrier signal in a conventional manner. The carrier signal is output from the unscrambler 17 to the receiver 16 through an output terminal 61.

It has been proposed that subscription television systems be assigned so-called "mid-band" frequencies between the frequencies assigned to numbered channels in the very high frequency (VHF) range. If this were the case, and if the receiver 16 (FIG. 1) were not equipped to receive these mid-band channels, the unscrambler illustrated in FIG. 2 would also operate as a frequency converter, i.e., it would be tuned to receive one of the mid-band frequencies, while the oscillator and modulator 58 would be tuned to output a signal at a frequency corresponding to an unused numbered channel, to which the receiver 16 could be tuned to receive the mid-band channels.

The techniques of scrambling and unscrambling television signals as thus far generally described with reference to FIGS. 1 and 2, while not particularly well known, are not believed to be novel, but are believed to require some emphasis in this specification in order to define the environment in which the present invention operates, and to convey an appreciation of its novel aspects and advantages. The present invention is principally concerned with improvements in the techniques of scrambling and unscrambling as specifically embodied in more detailed aspects of the unscrambler logic 45 (FIG. 2).

In accordance with the present invention, the mode by which the scrambling and unscrambling operations are performed may be varied automatically and rapidly in order to increase the security of the system and to deter unauthorized viewing. In brief, the scrambler-encoder 14 (FIG. 1) encodes into the television signal control signals addressed to a particular unscrambler 17 and directing it to initiate or terminate unscrambling operations, to change the mode of unscrambling, or to tune to a different incoming program. The unscrambler 17 (FIG. 1), and more specifically, the unscrambler logic 45 (FIG. 2), operate to decode the control signals and to perform the appropriate control function if it is addressed to the unscrambler 17 in question. If a subscriber has not paid or been charged for a particular program, the unscrambler 17 will not be directed to unscramble the program, which can be viewed, therefore, only in scrambled form. Since the scrambler-encoder 14 can be controlled to select a scrambling mode which results in extremely disconcerting patterns on the receiver 16, most unauthorized viewers are deterred from viewing a scrambled program. Furthermore, the system has a high degree of security, because the mode of scrambling may be rapidly varied in a practically random fashion.

More specifically, the scrambler-encoder 14 encodes control signals in that portion of the normal composite video and synchronization signal known as the vertical blanking interval. As is well known, a television picture is conventionally made up of a number of horizontal lines traced by an electron beam of varying intensity, usually from the top to the bottom of the picture. A full frame of the picture typically consists of two interlaced fields, each tracing alternate lines in the picture. The composite signal producing the trace of a field of the picture comprises, as can be seen in FIG. 5*a*, a video signal 71 and a succession of horizontal synchronization pulses 72 used to control transition of the beam from one line to the next. Between successive fields of the picture, there is a vertical blanking interval during which the beam is blanked out and positioned for the start of the next field. The vertical blanking interval conventionally includes a group of equalizing pulses 73, some wider vertical synchronization pulses 74, a further group of equalizing pulses 75, followed finally by a number of horizontal synchronization pulses 76 before the first line of video information in a new field.

Using a widely known technique, the control signals to be transmitted to the unscrambler 17 (FIG. 1) are encoded between the horizontal synchronization pulses 76 which occur towards the end of the vertical blanking interval, as shown at 77. The technique is similar, for example, to one used by television networks for encoding time-of-day signals into the vertical blanking interval. In the presently preferred embodiment, there are three "lines" of control signals, each coded in binary digital form as a series of pulses, and each line of signals being addressed to a particular unscrambler 17 (FIG. 1). They may conveniently be thought of as "lines" of signals or data, since they appear between horizontal synchronization pulses in much the same way as lines of video information. However, it will be understood that the control signals occur between fields of the picture and are not normally displayed as video signals. In any one vertical blanking interval, control signals may be transmitted to up to three separate unscramblers 17, using all three "lines", and, since there are 60 vertical blanking intervals per second in television systems in the United States, up to 180 separate unscramblers may be addressed per second. It will be appreciated that a greater number of receivers can be addressed by using more "lines" of the vertical blanking interval or encoding control signals for more than one unscrambler in a single "line". In the unused line immediately following the control signals, an unscrambler synchronization signal 78 is encoded from time to time. This signal, as will be subsequently discussed in detail, is required to synchronize operations of the scrambler-encoder 14 (FIG. 1) and the unscrambler 17.

The unscrambler logic 45 (FIG. 2) receives the composite video and synchronization signal over the line 46, this signal including the control signals encoded as illustrated and discussed with respect to FIG. 5*a*. In decoding these control signals, the unscrambler logic 45 utilizes horizontal and vertical synchronization pulses separated from the video signal by the synchronization separator 42 and transferred to the unscrambler logic 45 along the lines 43 and 44 respectively. It will be appreciated from FIG. 5*a*, that there is no single vertical synchronization pulse as such, but rather a series of pulses during the vertical blanking interval. The vertical synchronization pulse transmitted along the line 44 is termed a "stretched" vertical synchronization pulse and is developed in the synchronization separator 42, and illustrated in FIG. 5*b*. It will be seen that the stretched vertical synchronization pulse begins after the first group of equalizing pulses 73 in the vertical blanking interval, and ends after the final group of equalizing pulses 75 and immediately before resumption of the normally spaced horizontal synchronization pulses 76.

As will be seen, the stretched vertical synchronization pulse 79 is utilized in the unscrambler logic 45 in the decoding of the control signals 77 (FIG. 5*a*) and the unscrambler synchronization signals 78. It should further be noted that the horizontal synchronization signal developed in the synchronization separator 42 (FIG. 2), and transmitted to the unscrambler logic 45 along the line 43, is also a "stretched" horizontal synchronization pulse, including the so-called "front porch" and "back porch" portions of the conventional horizontal synchronization pulse, as well as a color burst signal included in color television transmissions.

The unscrambler logic 45 (FIG. 2) will now be described in greater detail with reference to FIG. 3. Basically, the logic illustrated in FIG. 3 operates to receive control signals encoded in the composite video and synchronization signal, at the terminal 85, to decode those control signals, utilizing the stretched vertical synchronization pulse input at 86 and the stretched horizontal synchronization pulse input at 87, and, if the control signals are addressed to the unscrambler in question, to place the decoded control signals in a control register 88. A scramble decoder 89, alternative embodiments of which will be discussed with reference to FIGS. 7–9, then uses the contents of the control register 88, along with other available signals, to generate the "invert" or "non-invert" signal, as shown at 91. This signal and its inverse, produced by an inverter 90, are the signals transmitted over the lines 47 and 48, respectively, in FIG. 2, and as will be recalled from the description of FIG. 2, these signals are used to control the gating circuits 38 and 39 (FIG. 2) and thereby to unscramble the scrambled video signals.

More specifically, the streched horizontal synchronization pulses input at 87 are fed to a horizontal synchronization pulse counter 92, which is a conventional, multi-stage, binary counter, arranged to have all of its stages reset to zero by a falling vertical synchronization pulse as introduced over line 93. The horizontal synchronization pulse counter 92 has the states of its various stages connected, as shown by line 94, to a horizontal synchronization count decoder 95, which uses conventional logic to compare the current setting of the horizontal synchronization pulse counter with a range of consecutive numbers designated $m$ through $(m+n1)$, and to generate an equality signal, as shown on line 96 if the current value of the count falls within that range.

It will be recalled from FIG. 5*a* that the control signals 77 are encoded between the horizontal synchronization pulses 76 towards the end of the blanking interval. When the stretched vertical synchronization pulse 79 (FIG. 5*b*) falls, this resets the horizontal synchronization pulse counter 92 (FIG. 3), which then begins to count the immediately following horizontal synchronization pulses 76 (FIG. 5*a*).

In general, the control signals may be encoded after any of the horizontal synchronization pulses 76 in the vertical blanking interval, but it is here assumed that they are encoded beginning after the mth horizontal synchronization pulse following the falling of the stretched vertical synchronization pulse 79 (FIG. 5*b*) and that the control signals and unscrambler synchronization signal occupy n consecutive "lines" in the vertical blanking interval. The horizontal synchronization count decoder 95 operates to recognize those of the horizontal synchronization pulses 76 (FIG. 5*a*) which precede each line of control signals 77 or the unscrambler synchronization signal 78.

The equality signal generated by the horizontal synchronization count decoder 95 is connected to a conventional gate circuit, the horizontal synchronization pulse gate 97, into which the stretched horizontal synchronization pulses introduced at 87 are also input over line 98. The gate 97 will, therefore, pass only those horizontal synchronization pulses numbered *m* through *m*+*n*1, i.e., those immediately preceding each line of the control signals 77 and the unscrambler synchronization signal 78 (FIG. 5*a*). These synchronization pulses are connected along line 99 to the set terminal of a data clock flip-flop 101, the "1" output of which is connected by line 102 to a clock gate 103.

An eight-megahertz clock 104 is also connected to the clock gate 103, as shown by line 105, and the output of the clock gate is connected by line 106 to a data clock circuit 107, the function of which will shortly become clear.

Figures 6A, 6B, 6C, 6D, 6E:
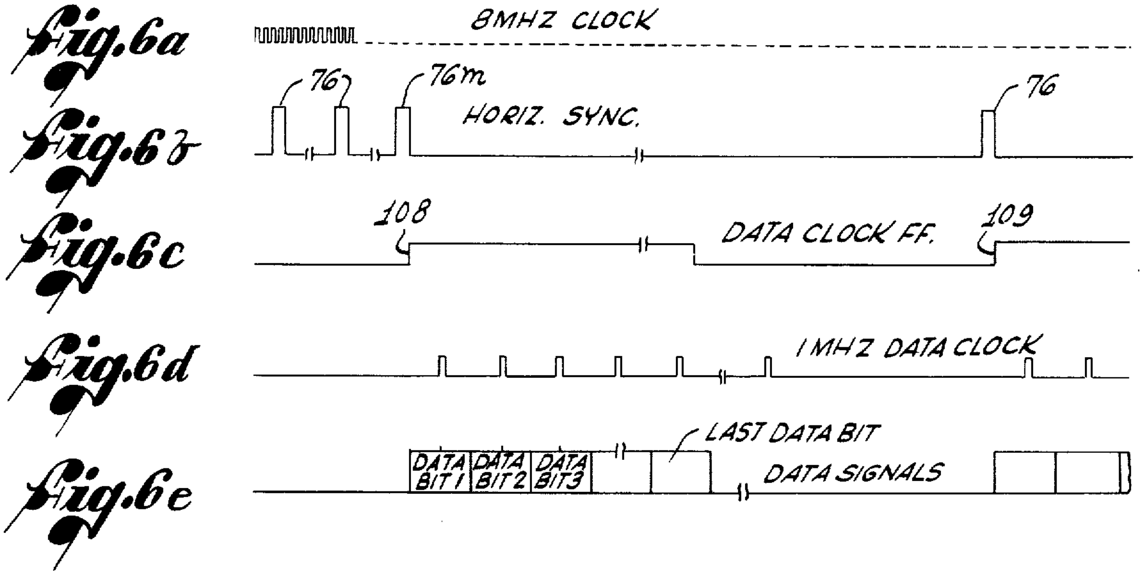
FIGS. 6*a–e* are time-amplitude graphs of various timing and data signals, and together comprise a timing diagram relating to the operation of the unscrambler logic of FIG. 3.

It will be seen that the logic as thus far described operates to set the data clock flip-flop 101 whenever one of the horizontal synchronization pulses preceding a line of control signals encoded in the vertical blanking interval is encountered, and that the data clock flip-flop is in turn used to gate the operation of the eight-megahertz clock 104. FIGS. 6*a–e* illustrate the timing relationships involved in the logic described thus far. FIG. 6*a* merely shows the eight-megahertz clock pulses, while FIG. 6*b* shows a series of horizontal synchronization pulses 76, the mth pulse being shown as 76*m*. FIG. 6*c* illustrates the condition of the data clock flip-flop 101, and it will be noted that the flip-flop is set on the occurrence of the mth horizontal synchronization pulse 76*m*, as shown at 108, and is also set on the occurrence of the next subsequent horizontal synchronization pulse, as shown at 109. FIG. 6*e* represents, on the same time scale, the location of the control signals encoded after the mth horizontal synchronization pulse.

In the presently preferred embodiment, the control signals are coded as binary pulses one microsecond in width. The function of the one-megahertz data clock 107 (FIG. 3) is to derive from the eight-megahertz clock 104 (FIG. 3) a sequence of clock pulses spaced by one microsecond, as shown in FIG. 6*d*. It is a further function of the one-megahertz data clock 107 (FIG. 3) to use a center sampling technique with respect to the encoded control signals, i.e., the one-megahertz clock pulses shown in FIG. 6*d* are approximately centered with respect to corresponding binary pulses comprising the encoded control signals. The one-megahertz data clock 107 (FIG. 3) achieves these functions using conventional digital logic to count the eight-megahertz clock pulses received over the line 106 and to generate an output clock pulse on the line 111 on the occurrence of the fourth incoming clock pulse, and every eighth clock pulse thereafter until the clock gate 103 is turned off.

The clock pulses from the one-megahertz data clock 107 are transmitted to a data signal gate 112 over line 113, and there used to clock the encoded control signals input at 85 into a conventional serial shift register 114. The clock signals from the one-megahertz data clock 107 are also directed to a data bit counter 115 over line 116, the counter being connected to generate a signal on line 117 when all bits of one "line" of the control signals have been clocked into the serial shift register 114. At this point, the serial shift register 114 contains the control signals that were encoded in one line of the vertical blanking interval. The signal on the line 117 indicating that all bits of the control signals have been decoded is connected by line 118 to the "clear" terminal of the data clock flip-flop 101. Thus, when all the data in a particular line has been decoded, the data clock flip-flop 101 is cleared to a zero condition, the clock gate 103 is thereby closed, and no further clock pulses are generated by the one-megahertz data clock 107. When the next horizontal synchronization pulse appears on the line 99, however, the data clock flip-flop 101 is set again, and the whole operation is repeated to clock another line of control signals into the serial shift register 114.

The signal on the line 117 indicating that the serial shift register 114 contains a full set of data, is also utilized to initiate operation of an address comparator 119, as shown by the line 120. The address comparator 119 uses conventional digital techniques to compare the setting of an identifier field, transmitted with the control signals and now in the serial shift register 114, with a unique address assigned to this particular unscrambler. It the comparison is unsuccessful, the control signals in the serial shift register 114 were not addressed to this particular unscrambler, and no further action is taken. In this event, the contents of the serial shift register 114 are lost after the next horizontal synchronization pulse initiating clocking of further control signals into the serial shift register. If, on the other hand, the address comparator 119 successfully matches the identifier field in the serial shift register 114 with the unique identifier of this particular unscrambler, then a control signal is generated on line 121 from the address comparator, and the contents of the serial shift register 114, excluding the identifier field, are gated over line 122 to the control register 88. The address comparator 119 also compares the identifier field in the serial shift register 114 with a special "all-call" identifier used to address all unscramblers in the system, and if a match is found, a control signal is generated on line 121 and the control register 88 receives new data over line 122. By means of this feature, all unscramblers in the system can be enabled or disabled with one control signal transmission.

The contents of the control register 88 include an "unscramble on" or "off " signal which is transferred to the scramble decoder 89 over line 123, to initiate or terminate unscrambling operations, and a mode select field which is also transmitted to the scramble decoder, over line 124, to select the mode according to which unscrambling is to be performed. The control register 88 may also contain a channel select field, as indicated at 125, and this may be connected to the channel selector 28 (FIG. 2) for the purpose of channel selection by remote control from the central computer 18 (FIG. 1), as shown by the dotted line 126 in FIG. 2.

Figure 3:
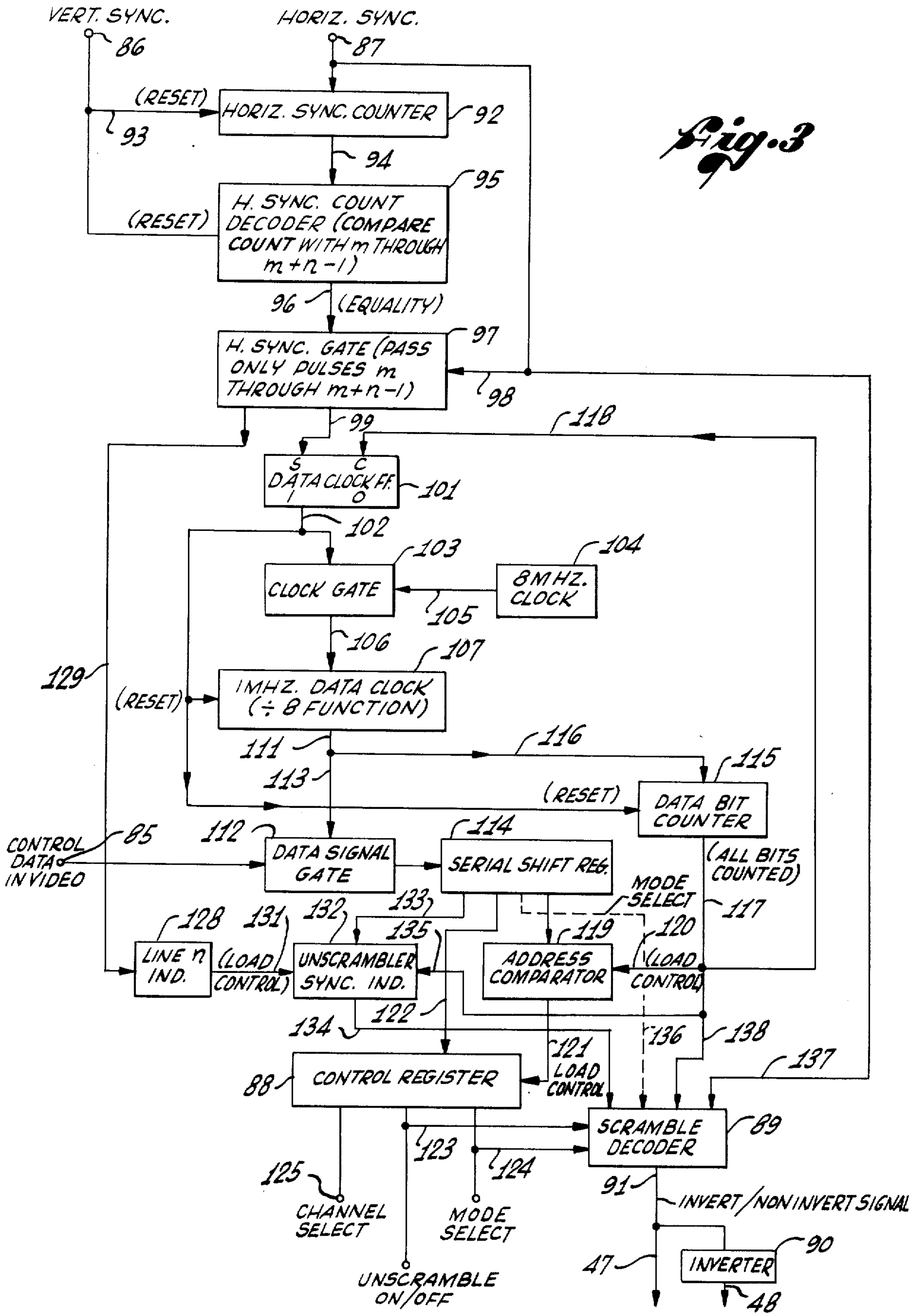
FIG. 3 is a more detailed block diagram of unscrambler logic employed in the unscrambler of FIG. 2.
Figures 4A, 4B, 5A, 5B:
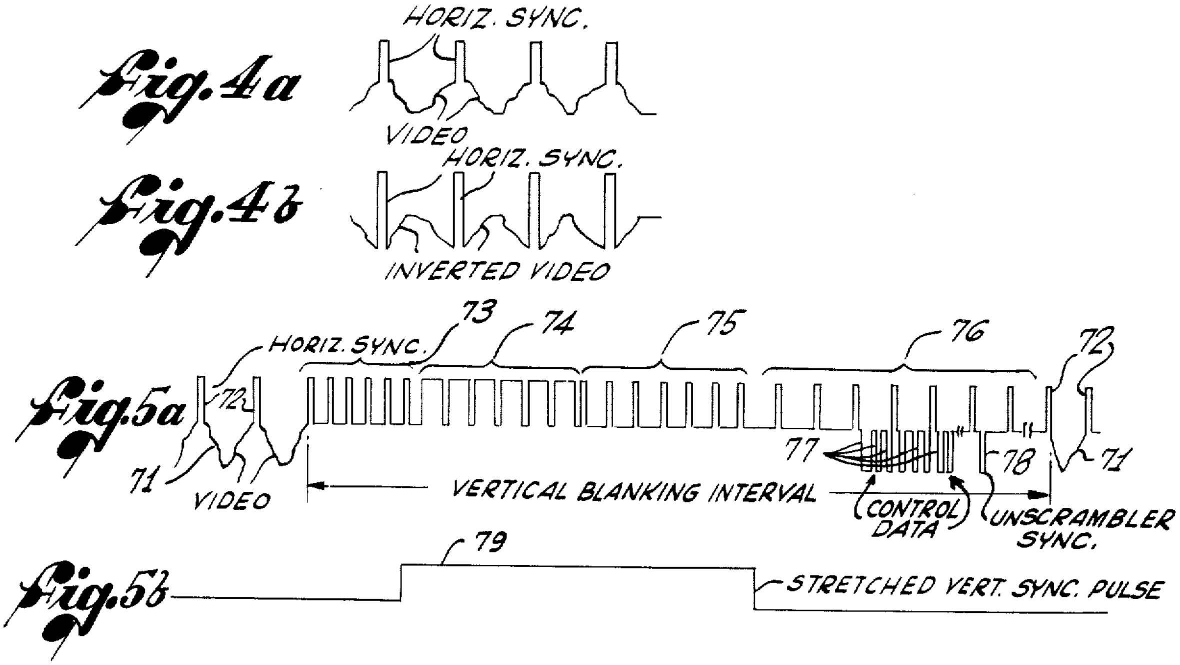
FIG. 4*a* is a time-amplitude graph of a conventional, composite video and synchronization signal.
FIG. 4*b* is a graph similar to that in FIG. 4*a*, in which the video signal portions have been inverted.
FIG. 5*a* is a time-amplitude graph of a composite video and synchronization signal, showing control signals encoded into the vertical blanking interval.
FIG. 5*b*is a time-amplitude graph of a "stretched" vertical synchronization pulse derived from the signal of FIG. 5*a;*

To complete the description of operation of this portion of the unscrambler logic in FIG. 3, it should also be noted that the one-megahertz data clock 107 and the data bit counter 115 are reset to a zero condition when the data clock flip-flop 101 is set to a "1" condition by an incoming horizontal synchronization pulse. Thus, each horizontal synchronization pulse initiates a new sequence of clocking and counting incoming control signals.

In general, the contents of the serial shift register 114 (FIG. 3) is volatile, and is of no interest unless the address comparator 119 determines that the control signals are intended for the particular unscrambler. However, there are two important exceptions to this.

The first exception involves decoding of the unscrambler synchronization pulse 78 (FIG. 5*a*), which is encoded in the last or nth line to be decoded in the vertical blanking interval. Only a single bit of information is needed for encoding the pulse, and the identifier field is meaningless in this *n*th line. To decode the unscrambler synchronization pulse, a line n indicator 128 or flip-flop is set only on the occurrence of the *n*th horizontal synchronization pulse gated by the horizontal synchronization pulse gate 97, as indicated by the line 129. This indicator 128 is used to gate, as shown by line 131, the unscrambler synchronization pulse from the serial shift register 114 into an unscrambler synchronization indicator 132, along the line 133. This unscrambler synchronization indicator 132 is another flip-flop, the output of which is connected to the scramble decoder 89, over line 134, and is used to synchronize unscrambling and scrambling operations.

It should also be noted that gating of the unscrambler synchronization pulse from the serial shift register 114 into the unscrambler synchronization indicator 132 is controlled in part by the control signal from the data bit counter 115 indicating that all data bits of a "line" of control signals have been shifted into the serial shift register 114. This is indicated by the line 135. Thus, the unscrambler synchronization pulse is gated into the unscrambler synchronization indicator 132 only when the line *n* indicator 128 is set and the unscrambler synchronization pulse has been shifted into its correct position in the serial shift register 114.

The other case where the control register 88 is bypassed and information is taken directly from the serial shift register 114 involves another use of thee last or *n*th encoded line of control signals, to contain mode selection information not intended for a particular unscrambler. Instead, this mode selection information is directed to all unscramblers which have previously been enabled by appropriately addressed control signals. In one of the alternative embodiments of the scrambler decoder 89 to be described, this technique is utilized, and new mode selection information may be passed to the scrambler decoder 89 during every vertical blanking interval if this is desired. This information will, of course, have no effect on unscramblers which have not been previously specifically addressed with an "unscramble on" control signal to initiate unscrambling.

The aforementioned technique wherein mode selection information is gated from the serial shift register 114 directly to the scramble decoder 89 is shown for clarity as a single broken line 136 in FIG. 3. However, it will be appreciated that the mode select signals are gated along the line 136 only when the *n*th line is detected and only when the data bit counter 115 detects that the entire line of data has been decoded. The logic for making these determinations is similar to that described above with respect to decoding unscrambler synchronization pulses from the *n*th line.

The scramble decoder 89 also has available as inputs the stretched horizontal synchronization pulses, along line 137, and the signal from the data bit counter 115 indicating that all control signal bits of a line have been entered into the serial shift register 114, as indicated by line 138. How these signals are utilized in the scramble decoder 89 depends on which embodiment of the scramble decoder is employed, and is discussed below with respect to FIGS. 7–9.

In summary, the logic illustrated in FIG. 3 operates to decode control signals encoded in the vertical blanking interval of the composite of video and synchronization signal, compares the address or identifier contained in the encoded control signals with the unique address of the particular unscrambler, and if a match is found, stores the control signals in the control register 88 for subsequent use by the scramble decoder 89. For the last or *n*th line of control signals decoded, there is no identifier encoded in the incoming signals, but there may still be control information contained in the serial shift register 114, and this is conveyed directly to the scramble decoder 89, where it will be of significance only if a previous control signal has been received to enable the particular unscrambler.

Figure 7:
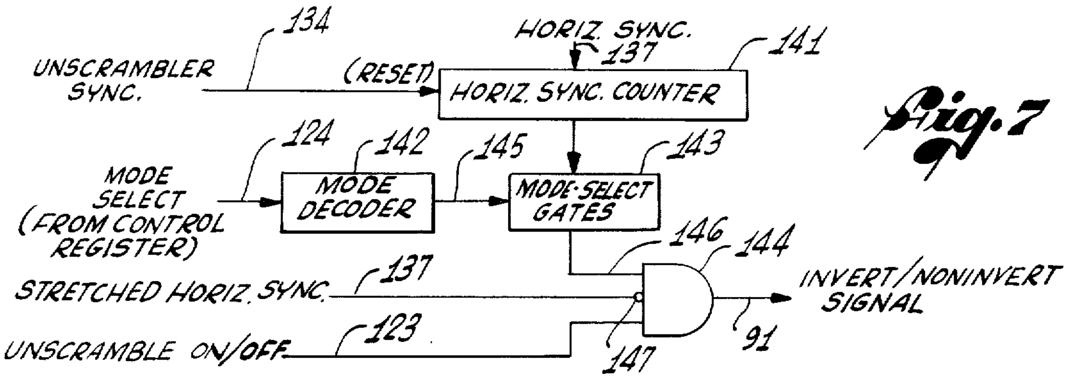
FIGS. 7–9 are block diagrams illustrating three alternative embodiments of a scramble decoder which may be included in the unscrambler logic of FIG. 3.
Figure 8:
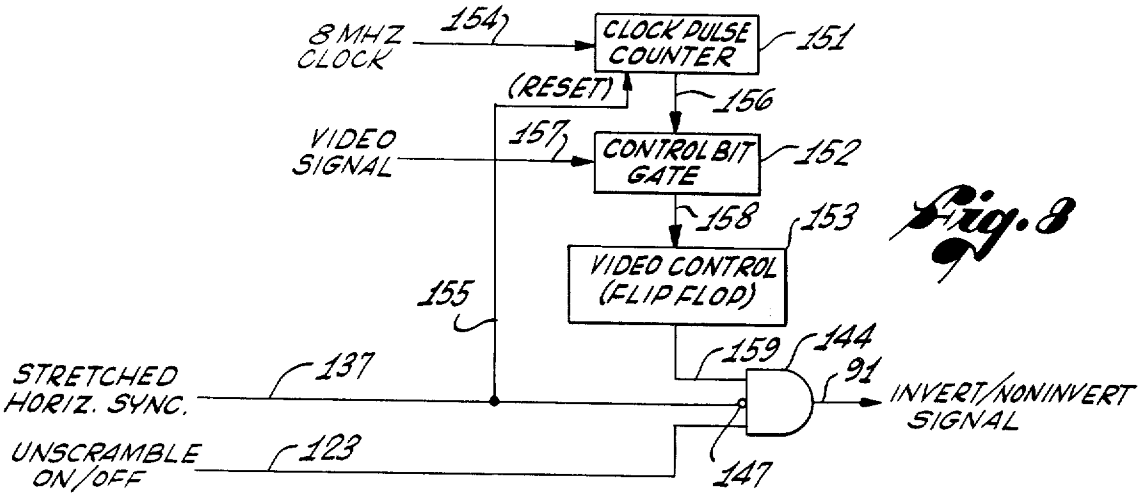
Figure 9:
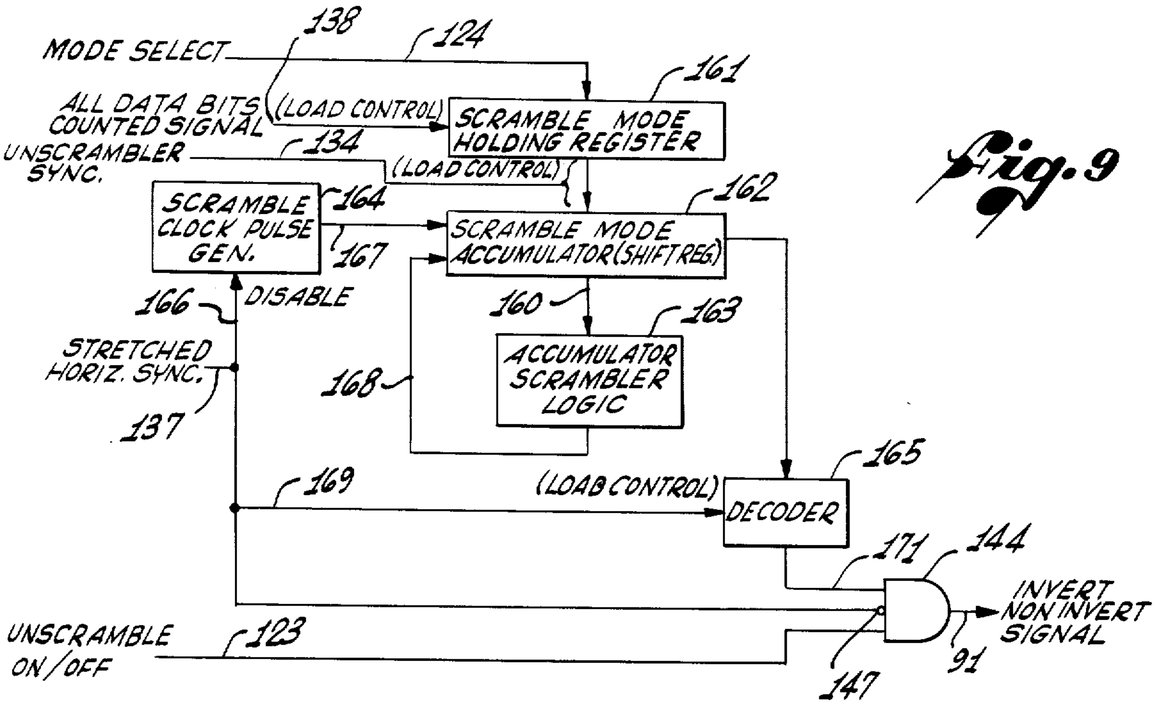

FIGS. 7–9 illustrate three alternative embodiments of the scrambler decoder 89 (FIG. 3), each employing a somewhat different technique to achieve the same basic end of unscrambling the video signals. Again, it will be appreciated that, for each of the embodiments, there exists a complementary scrambling circuit in the transmitter-encoder 14 (FIG. 1).

The embodiment illustrated in FIG. 7 includes a horizontal synchronization pulse counter 141, a mode decoder 142, mode select gates 143, and an AND gate 144. The horizontal synchronization pulse counter 141 is a conventional binary counter having, for example, sixteen digits, and connected to accumulate a count of horizontal synchronization pulses received over line 137. The mode select field from the control register 88 (FIG. 3) is input on the line 124 to the mode decoder 142, and if, for example, the mode select field is four bits long, the mode decoder operates in a conventional fashion as a four-to-sixteen bit decoder, to produce an output signal on one of sixteen output lines represented by the line 145. These output lines 145 are connected to the mode select gates 143 to tap off a signal from a particular bit position of the horizontal synchronization pulse counter 141. The mode select gates 143 would, in the example given, include sixteen AND gates and a single OR gate (not shown) to obtain the condition of the selected digit in the counter 141. Thus, a particular setting of the mode select field results in the selection of a particular bit from the counter 141, and the condition of the selected bit is then connected as an input to the AND gate 144 along the line 146.

It can be seen that, if the least significant bit position of the counter 141 is selected, the signal on the line 146 will be in a "1" condition for alternate horizontal lines, while if the next most significant bit of the counter 141 is selected, the signal on the line 146 will change condition every two lines, and so on. Since the "unscramble on" or "off" signal is connected by the line 123 as another input to the AND gate 144, this latter signal in the "off" condition has the effect of keeping the AND gate 144 turned off, thus leaving the AND gate output on line 91 in a "non-invert" condition and suppressing unscrambling of the video signal.

It will also be apparent that, depending on the setting of the mode select field, if the "unscramble on" or "off" signal is in the "off" condition, the result at the receiver 16 (FIG. 1) will be to display a series of regularly spaced bars of inverted video information on the screen. Furthermore, the mode select field may be varied to change the size of the bars to any desired number of lines, and, since there is an odd number of lines making up the total frame of the television picture and an even number of lines making up each bar, the bars will appear to roll on the screen to further disconcert the viewer.

If the mode select field is chosen to correspond to the selection of a relatively significant bit from the horizontal synchronization pulse counter 141, such that approximately a whole field or more of continuous video information is inverted, then the unscrambled picture will flicker perceptibly, to the further discomfort of the viewer. These effects can even be combined by systematic or random variations of the mode select field.

In order to keep the unscrambling of the video signal completely in synchronization with the scrambling process, the unscrambler synchronization pulse 78 (see FIG 5*a*) is encoded into the vertical blanking interval periodically to establish a common origin for both the scrambling and unscrambling processes. In this particular embodiment, the unscrambler synchronization pulse is used to reset the horizontal synchronization pulse counter 141 to a zero value, both at the scrambler-encoder 14 (FIG. 1) and in the scramble decoder 89 (FIG. 3). It should also be noted that the AND gate 144 has as a third input, over the line 137, the stretched horizontal synchronization pulse signals. This input is inverted as indicated by the small circle at 147, since the intention is to invert only the video signal, i.e., between but not including the stretched horizontal synchronization pulses.

The unscrambler synchronization pulse 78 (FIG. 5*a*) need not be present during every vertical blanking interval, and would typically be transmitted periodically to ensure that, if the scrambler-encoder 14 (FIG. 1) and the scramble decoder 89 (FIG. 3) should ever fall out of synchronization, then only a relatively small time would elapse before synchronization was established again by the next unscrambler synchronization pulse.

The alternative embodiment of the scrambler decoder illustrated in FIG. 8 includes a clock pulse counter 151, a control bit gate 152, a video control flip-flop 153, and an AND gate 144 having the same function as the similarly identified AND gate in FIG. 7. In this embodiment, a video control pulse is encoded into each horizontal synchronization pulse by the scrambler-encoder 14 (FIG. 1), and the logic illustrated in FIG. 8 merely decodes the pulse and utilizes it to determine whether or not to invert the immediately following video signal. The video control pulse is preferably encoded into an unused span of approximately two microseconds in the so-called "back porch" portion of the conventional horizontal synchronization pulse, between the color burst signals and the next video information.

The clock pulse counter 151 receives pulses, at an eight-megahertz rate, for example, over line 154, and the counter 151 is reset at the start of each horizontal synchronization pulse as indicated by the line 155. The clock pulse counter 151 measures the time from the start of the horizontal synchronization pulse to the point where the video control pulse is encoded, and then produces a gating signal on line 156, which enables the control bit gate 152 and gates the video control pulse from the video and synchronization signal, input over line 157, into the video control flip-flop 153, over line 158.

The video control flip-flop 153 thus indicates whether the immediately following video signal should be inverted or not, and this signal is connected as one input to the flip-flop 144 along line 159, and an "invert" or "non-invert" signal appears as the output to the AND gate 144 in the same manner as was described with respect to FIG. 7.

A third alternative embodiment of the scramble decoder 89 (FIG. 3) is illustrated in FIG. 9. The embodiment includes a scramble mode holding register 161, a scramble mode accumulator 162, accumulator scrambler logic 163, a scramble clock pulse generator 164, a decoder 165, and an AND gate 144 having the same function as the similarly identified AND gate in FIGS. 7 and 8.

When all the encoded control signals in a line have been clocked into the serial shift register 114 (FIG. 3), a control signal from the data bit counter 115 (FIG. 3) is transmitted to the scramble mode holding register 161 (FIG.9) over the line 138, and is used to gate the mode select field from the serial shift register 114 (FIG. 3) into the scramble mode holding register 161 (FIG. 9). The scramble mode holding register 161 holds the current mode of scrambling or unscrambling until a new one is received during a subsequent vertical blanking interval. When an unscrambler synchronization pulse 78 (FIG. 5*a*) is received, it is applied as indicated, over the line 134, to gate the contents of the scramble mode register 161 into the scramble mode accumulator 162. The scramble clock pulse generator 164 is disabled by the stretched horizontal synchronization pulses, as shown at 166, and outputs clock pulses only between stretched horizontal synchronization pulses, over line 167, to the scramble mode accumulator 162. The accumulator 162 is a conventional shift register and the effect of the scramble clock pulses from the pulse generator 164 is to shift the contents of the accumulator one bit position at a time and to enable the accumulator scrambler logic 163. As will be seen, the accumulator scrambler logic 163 operates to derive a single-bit signal from the current contents of the accumulator 162. More specifically, each clock pulse on the line 167 generates a single-bit shift signal with the current contents of the accumulator 162, and shifts a single bit into one end of the accumulator. Each clock pulse also shifts the contents of the accumulator 162 into the accumulator scrambler logic 163 along line 160. A single bit from the accumulator scrambler logic 163 is output to the accumulator 162, over line 168, simultaneously with the accumulator shift, and a bit at the other end of the accumulator is "shifted out" and lost.

The stretched horizontal synchronization pulses are also applied to the decoder 165 over line 169, to trigger operation of the decoder and thereby to derive an "invert" or "non-invert" signal from the current contents of the accumulator 162. In the presently preferred version of this embodiment, the decoder 165 is merely a flip-flop connected so that a horizontal synchronization pulse on the line 169 gates one digit of the accumulator 162 into the decoder flip-flop 165. The output condition of the decoder 165 is connected as an input to the AND gate 144, as shown by the line 171, and the AND gate operates in a manner similar to the AND gate in FIGS. 7 and 8.

Figure 10:
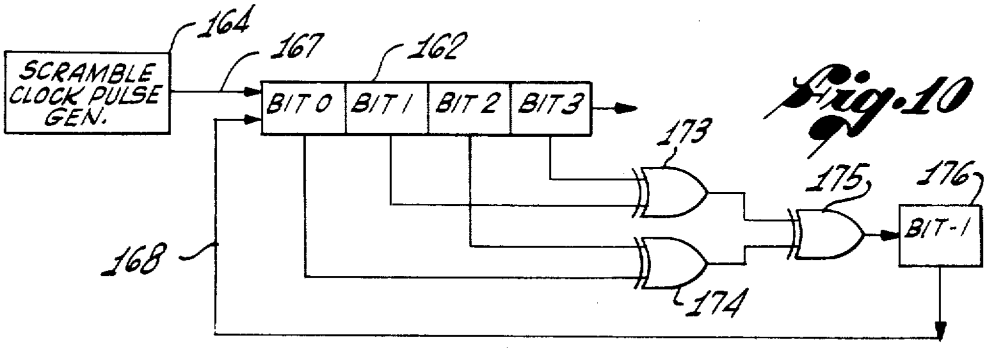
FIG. 10 illustrates, by way of example, one possible form of the accumulator scrambler logic included in the alternative embodiment of FIG. 9.

In operation, the contents of the accumulator 162 are themselves scrambled by the application of clock pulses from the scramble clock pulse generator 164, which have the effect of shifting the accumulator one bit position at a time and shifting a one-bit signal into the end of the accumulator, the signal being generated by the accumulator scrambler logic 163, which in turn, derives the one-bit signal from the previously current contents of the accumulator. The "invert" or "non-invert" signal at the output 91 of the AND gate 144 is thus varied in a manner dependent on the accumulator scrambler logic 163, which may be any desired logical arrangement designed to produce a pre-determined sequence of "invert" or "non-invert" signals. An elementary example of the accumulator scrambler logic 162 (FIG. 9) is presented in FIG. 10, in which the scramble mode accumulator is shown as a four-bit shift register, with bits numbered zero through three, and in which the accumulator scrambler logic comprises three exclusive OR gates 173, 174 and 175, and a flip-flop 176. In the illustrative logic of FIG. 10, the odd numbered bits of the accumulator 162 are connected as inputs to exclusive OR gate 173, the even numbered bits are connected as inputs to the exclusive OR gate 174, and the outputs of the exclusive OR gates 173 and 174 are connected as inputs to the exclusive OR gate 175. The output of the exclusive OR gate 175 is appropriately gated to the flip-flop 176, which is used to temporarily store the one-bit signal derived by the exclusive OR gates 173–175. On each clock pulse from the scramble clock pulse generator 164, a new one-bit result is gated into the flip-flop 176, the one-bit signal previously stored there is gated into the zero-numbered bit position of the accumulator 162, and the contents of the accumulator are shifted one bit position to the right, bit number three being lost. It will be appreciated that connections for various timing signals have been omitted for clarity from FIG. 10, as well as from certain portions of the other figures, but that those of ordinary skill in the art will have little difficulty in supplying the necessary timing circuitry, all of which is conventional and well known.

It should be emphasized that the accumulator scrambler logic 163 (FIG. 9) can be designed to produce any desired pattern of inverting and non-inverting signals for application to scrambling or unscrambling circuits, and that it may even be designed to produce a one-bit result in a random, yet predictable fashion. Apparent randomness of the mode of scrambling results in a highly secure system, but the randomness is still predictable in the sense that a similar accumulator scrambler logic element is operating in the scrambler-encoder 14 (FIG. 1) in synchronism with the accumulator scrambler logic 163 in FIG. 9.

It will be appreciated from the foregoing that the present invention significantly advances the state of the art of scrambling and unscrambling television signals, specifically in the field of subscription television systems. In particular, the invention can operate to vary the scrambling mode rapidly and automatically, and even in an apparently random fashion. This greatly increases the security of the system from unauthorized unscrambling of signals intended only for certain subscribers, and allows the scrambling mode to be selected and varied so as to deter most unauthorized viewers from watching the scrambled video patterns.

While particular alternative embodiments of the invention have been illustrated and described in detail, it will be appreciated that various modifications can be made without departing from the spirit and scope of the invention. Accordingly, the invention is not to be limited, except as by the appended claims.

We claim:

1. For use with a receiver in a subscription television system, a method of unscrambling television signals transmitted in a scrambled form having selected portions containing only video information inverted according to a preselected mode from among a plurality of modes of scrambling, each mode being characterized by a sequence of alternating inverted and non-inverted groups of lines, said method comprising the steps of:

receiving the scrambled signals together with control signals and identifying codes both encoded on a common video signal carrier, the identifying codes serving to identify receivers authorized to unscramble the scrambled signals;

decoding the encoded control signals and identifying codes;

comparing each of the identifying codes with one associated with the receiver;

unscrambling by selective inversion of the inverted video portions of the scrambled television signals, according to the same preselected mode as used for scrambling; and controlling said unscrambling step, if said comparing step results in a match, in accordance with the decoded control signals, said controlling step including controlling the preselected mode in accordance with mode selection signals included with the control signals.

2. A method as set forth in claim 1, wherein said controlling step includes enabling and disabling selective inversion in response to particular control signals transmitted for that purpose.

3. A method as set forth in claim 1, further including the step of unscrambling audio signals received in said receiving step, by applying a frequency shift to a carrier signal modulated by the audio signals.

4. A method as set forth in claim 1, wherein:

the control signals are encoded as digital pulses in vertical blanking intervals of composite video and synchronization signals; and said decoding step includes gating the digital pulses into a register.

5. A method as set forth in claim 4, wherein:

the control signals include an unscrambler synchronization pulse; and said method further includes the step of synchronizing said step of unscrambling with a corresponding scrambling step, in response to the unscrambler synchronization pulse.

6. A method as set forth in claim 4, wherein:

said controlling step further includes enabling and disabling selective inversion; and the particular signals transmitted to effect said step of controlling the preselected mode are effective to select desired unscrambling modes at all receivers having selective inversion enabled.

7. A method as set forth in claim 1, wherein said step of unscrambling includes:

counting portions of the video signals corresponding to lines of the television picture in a counter having a plurality of digits; and inverting the video signals only when a particular digit of the counter is in a particular state; and said step of controlling the preselected mode of unscrambling is effected by varying selection of the particular digit from the counter, whereby selection of a digit of low significance in the counter results in frequent inversion of the video signals and selection of a digit of high significance in the counter results in less frequent inversion.

8. A method as set forth in claim 7, wherein said step of inverting the video signals includes selecting the particular digit and its particular state in such a manner as to produce rolling patterns of inverted lines in the television picture.

9. A method as set forth in claim 7, wherein the control signals are encoded in vertical blanking intervals of the video signals, and said method further includes:

periodically receiving unscrambler synchronization signals also encoded in vertical blanking intervals; and resetting the line counter in response to receipt of an unscrambler synchronization signal, thereby synchronizing unscrambling operations with complementary scrambling operations.

10. A method as set forth in claim 9, wherein said step of unscrambling includes generating an inversion control signal from the state of the particular digit in the counter and from the state of a horizontal synchronization pulse signal, whereby inversion is performed only between horizontal synchronization pulses and only when the particular digit is in the particular state.

11. A method as set forth in claim 1, wherein:

said step of controlling the preselected mode of unscrambling includes encoding an inversion indicator signal for transmission with each line of the television picture; and said step of unscrambling includes decoding said inversion indicator signal and inverting the video signals only when said inversion indicator signal is in a particular state.

12. A method as set forth in claim 11, wherein:

said inversion indicator signal is encoded at a selected location with respect to each horizontal synchronization pulse; and said step of decoding said inversion indicator signal includes measuring elapsed time from the start of a horizontal synchronization pulse to the location of said inversion indicator signal, and gating said inversion indicator signal into a register.

13. A method as set forth in claim 11, wherein said step of unscrambling includes generating an inversion control signal from said inversion indicator signal and from a horizontal synchronization pulse signal, whereby inversion is performed only between horizontal synchronization pulses and only when said inversion indicator signal is in the particular state indicating inversion.

14. A method as set forth in claim 1, wherein:

said step of controlling the preselected mode of unscrambling includes storing said unscrambler mode selection signals in register means; and said step of selectively inverting includes:

scrambling the signals stored in the register means according to a predetermined pattern;

deriving an inversion indicator signal from the scrambled stored signals; and inverting the video signals only when the inversion control signal is in a particular state.

15. A method as set forth in claim 14, wherein the register means include shift register means having a plurality of digits, and said step of scrambling the signals stored in the register means include:

periodically shifting the signals in the shift register means a predetermined number of times between successive horizontal synchronization pulses separating the lines;

logically generating a digit from the plurality of digits in the shift register means; and gating the generated digit into the shift register means during each of said shifting steps.

16. A method as set forth in claim 15, wherein said step of logically generating a digit includes performing successive exclusive OR functions on the plurality of digits to obtain a single-digit result.

17. A method as set forth in claim 14, wherein said step of deriving an inversion indicator signal is effected by sensing a particular digit in the shift register means.

18. A method as set forth in claim 14, wherein:

the encoded control signals include an unscrambler synchronization signal; and said method further includes the step of synchronizing said step of selectively inverting with a corresponding inverting step performed in scrambling the video signals, by resetting the shift register means to a starting value on receipt of the unscrambler synchronization signal.

19. A method as set forth in claim 14, wherein said step of unscrambling includes generating an inversion control signal from the inversion indicator signal and from a horizontal synchronization pulse signal, whereby inversion is performed only between successive horizontal synchronization pulses and only when the inversion indicator signal is in the particular state indicating inversion.

20. For use with receivers in a subscription television system, a method of unscrambling television video signals scrambled by inversion of only video portions of the signals corresponding to preselected lines in a television picture, said method comprising the steps of:

receiving and decoding control signals encoded from time to time on a common video carrier with the video signals, receiver identifying codes being also encoded on the same common video carrier, the control signals including an unscrambler enabling and disabling signal, and unscrambler mode selection signals;

enabling and disabling unscrambling operations at selected receivers identified by the identifying codes in response to the unscrambler enabling and disabling signal;

selectively inverting the inverted portions of the video signals, when unscrambling operations are enabled, according to a mode determined by the unscrambler mode selection signals and characterized by a sequence of alternating inverted and non-inverted groups of lines; and varying the mode of unscrambling on receiving and decoding further unscrambler mode selection signals.

21. For use with receivers in a subscription television system, apparatus for unscrambling television video signals scrambled by inversion of only video portions corresponding to preselected lines in the television picture, said apparatus comprising:

means for receiving and decoding identifying codes and control signals both encoded from time to time on a common video signal carrier for transmission with the video signals, said control signals including unscrambler mode selection signals;

means for comparing received identifier codes with an identifier code generated at a receiver location;

means for enabling and disabling unscrambling operations in selected receivers according to the determination of said comparing means; and means for selectively inverting said video signals, when unscrambler operations are enabled, according to a mode determined by said unscrambler mode selection signals.

22. Apparatus as set forth in claim 21, wherein said means for selectively inverting includes:

means for counting portions of the video signals corresponding to lines of the television picture, said counting means having a plurality of digits; and means responsive to said counting means for inverting the video signals only when a particular digit of said counting means is in a particular state; and said means for selectively inverting being operable to vary selection of the particular digit from said counting means, whereby selection of a digit of low significance in said counting means results in frequent inversion of the video signals and selection of a digit of high significance in said counting means results in less frequent inversion.

23. Apparatus as set forth in claim 22, wherein said control signals are encoded in vertical blanking intervals of the video signals, and said apparatus further includes;

means for receiving and decoding periodically transmitted unscrambler synchronization signals also encoded in the vertical blanking intervals; and means for resetting said counting means in response to said unscrambler synchronization signal, thereby synchronizing unscrambler operations with complementary scrambling operations.

24. Apparatus as set forth in claim 22, wherein said means for selectively inverting includes means for generating an inversion control signal from the state of said particular digit in said counting means and from the state of a horizontal synchronization pulse signal, whereby inversion is performed only between horizontal synchronization pulses and only when said particular digit is in said particular state.

25. Apparatus as set forth in claim 21, wherein:

an inversion indicator signal is encoded for transmission with each line of the television picture; and said means for selectively inverting includes means for decoding said inversion indicator signal and inverting said video signals only when said inversion indicator signal is in a particular state.

26. Apparatus as set forth in claim 25, wherein:

said inversion indicator signal is encoded at a selected location with respect to each horizontal synchronization pulse; and said means for decoding said inversion indicator signal includes means for measuring elapsed time from the start of each horizontal synchronization pulse to the location of said inversion indicator signal, register means, and gating means for gating said inversion indicator signal into said register means.

27. Apparatus as set forth in claim 25, wherein said means for selectively inverting includes means for generating an inversion control signal from said inversion indicator signal and from a horizontal synchronization pulse signal, whereby inversion is performed only between horizontal synchronization pulses and only when said inversion indicator signal is in the particular state indicating inversion.

28. Apparatus as set forth in claim 21, wherein said means for selectively inverting further includes:

register means for storing said unscrambler mode selection signals;

means for scrambling the signals stored in said register means according to a predetermined pattern;

means for deriving an inversion indicator signal from the scrambled stored signals; and means for inverting said video signals only when said inversion indicator signal is in a particular state.

29. Apparatus as set forth in claim 28, wherein said register means includes shift register means having a plurality of digits, and said means for scrambling the signals stored in said register means include:

means for shifting the signals in said shift register means a predetermined number of times between successive horizontal synchronization pulses separating the lines;

logic means for generating a digit from the plurality of digits in said shift register means; and means for shifting said generated digit into said shift register means each time said stored signals in said shift register means are shifted by said means for periodically shifting.

30. Apparatus as set forth in claim 29, wherein said logic means for generating a digit includes exclusive OR gate means connected to said plurality of digits to obtain a single-digit result.

31. Apparatus as set forth in claim 28, wherein said means for deriving said inversion indicator signal includes means for gating a particular digit from said shift register means.

32. Apparatus as set forth in claim 28, wherein:

certain coded control signals include an unscrambler synchronization signal; and said apparatus further includes means for synchronizing said means for selectively inverting with corresponding means used in scrambling the video signals, by resetting said shift register means to a starting value on receipt of said unscrambler synchronization signal.

33. For use in a subscription television system with a plurality of subscriber's receivers identified by addresses, a method of scrambling and unscrambling television signals, comprising the steps of:

inverting at a transmitter selected video portions of a composite video signal, the inverted portions representing lines of a television picture selected according to a preselected scrambling mode from among a plurality of modes, each mode being characterized by a sequence of alternating inverted and non-inverted groups of lines;

encoding with the video signal on a common video carrier control signals to control unscrambling at receivers of authorized subscribers, and address signals identifying authorized receivers;

transmitting and receiving the video, control and address signals on the common video carrier;

decoding the encoded control and address signals; and controlling selected inversion of the video signals at a receiver in accordance with the scrambling mode, and in response to the control signals if the address signals match the address of the receiver, said controlling step including varying the scrambling mode in response to particular settings of the control signals.

34. A method as set forth in claim 33, wherein said steps of inverting and controlling selected inversion include inverting alternate groups of equal numbers of lines.

35. A method as set forth in claim 33, wherein the control signals include an inversion indicator signal encoded with each line transmitted.

36. A method as set forth in claim 33, wherein:
said steps of inverting and controlling selected inversions include generating an inversion control signal for each line of the picture, at the transmitter and at the receiver; and
said method further includes the step of synchronizing said steps of generating an inversion control signal at the transmitter and the receiver.

37. For use in a subscription television system with a plurality of subscribers' receivers, a method of scrambling television signals at a transmitter, comprising the steps of:
selectively inverting video portions of a composite video signal corresponding to lines of a television picture selected according to a preselected scrambling mode from among a plurality of modes, each mode being characterized by a sequence of alternating inverted and non-inverted groups of lines;
encoding for transmission with the video signals on a common video carrier, control signals to control unscrambling operations, and address signals designating authorized receivers; and
varying the preselected scrambling mode and further encoding control signals to correspondingly vary unscrambling operations.

38. A method as set forth in claim 37, wherein said step of selectively inverting includes inverting alternate groups of equal numbers of lines.

39. A method as set forth in claim 37, wherein the control signals include an inversion indicator signal encoded with each line transmitted.

40. A method as set forth in claim 37, wherein:
said step of selectively inverting includes generating an inversion control signal for each line of the picture; and
said method further includes the step of generating a synchronizing signal to synchronize unscrambling operations at the receivers with said step of generating an inversion control signal.

41. For use in a subscription television system, a method of unscrambling at a subscriber location television signals transmitted in scrambled form to a plurality of receivers, said method comprising the steps of:
receiving the scrambled television signals at unscrambling means connected with a receiver at the subscriber location, the television signals including a composite video and synchronization signal having only video portions scrambled, and having unscrambler control signals and subscriber identifying codes encoded into the composite signal for transmission on a common video carrier;
decoding the encoded control signals and identifying codes;
comparing each received and decoded identifying code with an identifying code generated at the unscrambling means;
controlling the unscrambling means in response to the decoded signals accompanying the transmitted identifying codes, provided said comparing step results in a match, said controlling step including, as determined by the particular control signals, enabling the unscrambling means to unscramble the video portions of the television signals in accordance with an unscrambling mode also indicated by the control signals, and changing the unscrambling mode from time to time as indicated by further control signals, thereby to increase the security of the system and to deter unauthorized viewing; and
unscrambling the video portions of the scrambled television signals in response to said controlling step.

42. A method as set forth in claim 41, and further including the step of synchronizing said unscrambling step with a corresponding scrambling step, in response to a synchronizing signal periodically included for transmission with the control signals.

43. A method as set forth in claim 41, wherein said controlling step includes selectively controlling channel selection at the subscriber location in response to channel selection signals included with the control signals.

44. A method as set forth in claim 41, wherein said unscrambling step includes the step of inverting selected video portions of the composite signal corresponding to selected lines of video information, the selection being in accordance with a mode of unscrambling determined by said controlling step and characterized by a sequence of alternating inverted and non-inverted groups of lines.

45. A method as set forth in claim 44, wherein:
said unscrambling step includes unscrambling audio signals; and
said step of unscrambling audio signals includes applying a frequency shift to a carrier signal modulated by the audio signals.

46. A method as set forth in claim 44, wherein said step of inverting includes:
counting portions of the composite video and synchronization signal corresponding to lines of video information in a counter having a plurality of digits; and
inverting the video signals only when a particular digit of the counter is in a particular state; and wherein
said step of changing the unscrambling mode is effected by varying selection of the particular digit from the counter, whereby the selection of a digit of low significance in the counter results in frequent inversion of the video signals and selection of a digit of high significance in the counter results in less frequent inversion.

47. A method as set forth in claim 46, wherein said step of inverting includes selecting the particular digit of the line counter, and its particular state, in such a manner as to produce rolling patterns of inverted lines in the television picture.

48. A method as set forth in claim 46, wherein said step of synchronizing includes:
periodically receiving unscrambled synchronization signals also encoded into the composite signal; and
resetting the line counter to a predetermined value in response to receipt of an unscrambler synchronization signal, thereby synchronizing unscrambling operations with complementary scrambling operations.

49. A method as set forth in claim 48, wherein said step of resetting the line counter resets the counter to zero.

50. For use in a subscription television system, apparatus for unscrambling at a subscriber location television signals transmitted in scrambled form, said apparatus comprising:

receiving means, for receiving the scrambled television signals at the subscriber location, the television signals including a composite video and synchronization signal having only video portions scrambled and having unscrambler control signals and subscriber identifying codes encoded into the composite signal on a common video carrier;

decoding means, connected with said receiving means, for decoding the encoded control signals and identifying codes;

comparing means, connected with said decoding means, for comparing each received and decoded identifying code with an identifying code generated at the subscriber location;

unscrambling means for unscrambling the video portions of the composite signal in accordance with a mode of operation of said unscrambling means indicated by the control signals, if said comparing means finds a match; and control means, for controlling said unscrambling means in response to the decoded control signals, if said comparing means finds a match, said control means including means for selecting different modes of operation of said unscrambling means as indicated by further control signals received from time to time, thereby increasing the security of the system and deterring unauthorized viewing.

51. Apparatus as set forth in claim 50, and further including means for synchronizing operation of said unscrambling means in response to a synchronizing signal periodically included for transmission with the control signals.

52. Apparatus as set forth in claim 51, and further including means for selecting a television channel for viewing at the subscriber location, in accordance with channel selection signals included with the control signals.

* * * * *

UNITED STATES PATENT AND TRADEMARK OFFICE

CERTIFICATE OF CORRECTION

PATENT NO. : 3,919,462

DATED : November 11, 1975

INVENTOR(S) : Albert F. Hartung, et al.

It is certified that error appears in the above-identified patent and that said Letters Patent are hereby corrected as shown below:

Column 2, line 68, "of" should be "or".

Column 8, line 45, "(m+nl)" should be "(m+n-1)".

Column 9, line 8, "m+nl," should be "m+n-1,".

Column 11, line 34, "thee" should be "the".

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*